United States Patent [19]

Mimura et al.

[11] Patent Number: 5,306,772

[45] Date of Patent: Apr. 26, 1994

[54] POLYACETAL RESIN COMPOSITION AND ITS MOLDED ARTICLE

[75] Inventors: Hiroshi Mimura; Akiyoshi Shibata; Satoshi Nagai, all of Hiratsuka; Masaharu Kimura, Toyonaka; Makoto Kobayashi, Hiratsuka, all of Japan

[73] Assignee: Mitsubishi Gas Chemical Company, Inc., Tokyo, Japan

[21] Appl. No.: 38,193

[22] Filed: Mar. 24, 1993

Related U.S. Application Data

[63] Continuation of Ser. No. 835,598, Feb. 14, 1992, abandoned.

Foreign Application Priority Data

Feb. 18, 1991 [JP] Japan ................. 3-44073
Feb. 18, 1991 [JP] Japan ................. 3-44074

[51] Int. Cl.$^5$ ............ C08L 59/02; C08L 59/04; C08L 27/16
[52] U.S. Cl. ................. 525/92; 525/154; 525/199
[58] Field of Search ............ 525/92, 154, 199

[56] References Cited

U.S. PATENT DOCUMENTS 5,086,095  2/1992  Katsumata ............ 525/155

FOREIGN PATENT DOCUMENTS 2389657 12/1978 European Pat. Off. .
0421723  4/1991 European Pat. Off. .
39-7615   5/1964 Japan .
46-30590  9/1971 Japan .
56-34024  8/1981 Japan .
59-223755 12/1984 Japan .
60-199046 10/1985 Japan .
61-31142  7/1986 Japan .
61-36021  8/1986 Japan .

*Primary Examiner*—James J. Seidleck
*Assistant Examiner*—W. Robinson H. Clark
*Attorney, Agent, or Firm*—Wenderoth, Lind & Ponack

[57] ABSTRACT

A polyacetal resin composition produced by melt-kneading polyacetal, polyfluorovinylidene and optionally, an organic lubricant at a temperature higher than the melting point of each of the polyacetal and the polyfluorovinylidene; and a molded article formed from the above polyacetal resin composition. This resin composition has excellent resistance to frictional wear and heat stability, and is useful as a material for slide parts for use in electric and electronic appliances, business machines, automobiles, and other industrial machines.

19 Claims, No Drawings

POLYACETAL RESIN COMPOSITION AND ITS MOLDED ARTICLE

This application is a continuation of application, Ser. No. 07/835,598, filed Feb. 14, 1992, now abandoned.

DETAILED DESCRIPTION OF THE INVENTION

The present invention relates to a polyacetal resin composition and molded articles therefrom. More specifically, it relates to a polyacetal resin composition which has excellent self-lubricity and heat stability and is suitable as a material for producing slide parts which are expected to meet high qualities required for use in electric and electronic appliances, business machines, automobiles and industrial machines, such as a bearing, a gear, a cam, a roller, a bed slide, a pulley, a lever and a guide, particularly a polyacetal resin composition which causes little mold deposit, and molded articles formed from the composition.

Polyacetal is very useful as a molding material for slide parts such as a gear and a bearing since it has excellent mechanical properties, good wear resistance and light weight. Polyacetal is usually injection-molded into a gear, a cam, a roller, a bed slide, a pulley, a lever, a guide, etc.

For improving the resistance to frictional wear, one method is proposed in which polytetrafluoroethylene is incorporated (see Japanese Patent Publications Nos. 7615/1964 and 30590/1971). However, this method involves a serious defect that a mold deposit is liable to occur when the resin composition is molded.

For the purpose of decreasing a mold deposit, there are proposed a method in which a specific ester compound and polyethylene are allowed to coexist (see Japanese Patent Publication No. 34024/1981), a method in which polycarbonate is incorporated into polyacetal and melted together (see Japanese Patent Publication No. 36021/1986), and a method in which polycarbodiimide is incorporated and melted together (see Japanese Patent Publication No. 31142/1986). These methods produce an expected effect as far as the decrease in a mold deposit is concerned. Since, however, the molded articles produced according to the above methods are, for example, degraded or deteriorated in mechanical properties due to the ester compound and polyethylene incorporated therein, the above methods are improper as a method for producing a molding material that is required to show high precision.

On the other hand, Japanese Laid-open Patent Publication No. 223755/1984 discloses a composite material prepared by kneading and mixing a thermoplastic polymer and a fiber-reinforcing-layer-forming crystalline fluoro polymer with shearing or stretching at a temperature lower than the melting temperature of the crystalline fluoro polymer. In the Japanese Laid-open Patent Publication No. 223755/1984, as specific examples of the thermoplastic polymer, Examples describe polyphenylene sulfide, polycarbonate, a styrene-acrylonitrile copolymer, an α-methylstyreneacrylonitrile copolymer, amorphous polyethylene terephthalate, polystyrene, polysulfone and polyethylene terephthalate, and in addition to these, the specification lists polyamide, polymethyl methacrylate, polyvinyl chloride, polyether, polyacetal, polyurethane, etc. As specific examples of the above crystalline fluoro polymer, Examples describe tetrafluoroethylene alone, and in addition to this, the specification lists perfluorinated poly(ethylenepropylene), a perfluoroalkoxy polymer, polyfluorovinylidene. However, the specification neither describes any combination of polyacetal with polyfluorovinylidene nor suggests any possibility or effect of the combination.

Japanese Laid-open Patent Publication No. 199046/1985 discloses a vinylidene fluoride resin composition comprising 95 to 30% of a vinylidene fluoride resin and 5 to 70% of polyether (including polyacetal). The invention described in this Publication has an object to obtain a film having excellent dielectric properties, and nothing is described concerning the mechanical properties and injection moldability of the composition, which are essential for molding materials. That is, in the above Japanese Laid-open Patent Publication No. 199046/1985, Examples describe only dielectric constants and dielectric dissipation factors of inflation films formed from a composition having a polyfluorovinylidene/polyacetal mixing ratio of 50/50 (weight percent) or 60/40 (weight percent)

It is an object of the present invention to provide a polyacetal resin composition.

It is another object of the present invention to provide a polyacetal resin composition which has excellent resistance to frictional wear, mechanical properties and heat stability and causes little mold deposit during injection molding.

It is another object of the present invention to provide a polyacetal resin composition which can be suitably used as a material for slide parts expected to meet high qualities required for use in electric and electronic appliances, business machines, automobiles and industrial machines, such as a bearing, a gear, a cam, a roller, a bed slide, a pulley, a lever and a guide.

It is still another object of the present invention to provide a variety of molded articles produced from the above composition.

Other objects and advantages of the present invention will be apparent from the following description.

According to the present invention, the above objects and advantages of the present invention are achieved, first, by a polyacetal resin composition (to be sometimes referred to as "first resin composition") produced by melt-kneading 80 to 99.9% by weight of polyacetal and 0.1 to 20% by weight of polyfluorovinylidene at a temperature higher than the melting point of each of the polyacetal and the polyfluorovinylidene.

The resin composition of the present invention has its characteristic feature in that it causes little mold deposit as described above.

The above "mold deposit" refers to adherence of components derived from the resin materials to a mold as the injection molding is repeatedly carried out. The mold deposit has a detrimental effect on the smoothness and uniformity of molded article surfaces, and eventually causes defectiveness in appearance and dimension of the molded article in the mass production of gears, rollers, etc.

Examples of the polyacetal used in the present invention preferably include a homopolymer which is composed mainly of an oxymethylene chain and is obtained by polymerization of formaldehyde or trioxane, and a copolymer or block polymer which is formed from trioxane and a cyclic ether such as ethylene oxide, propylene oxide or dioxolane. A polyacetal having a melt index (MI) (measured according to ASTM-D1238 at 190° C. under a load of 2.16 kg) of 0.01 to 60 is more preferred. Commercially available polyacetals generally contain a stabilizer such as melamine, a melamine resin, cyano-guanidine or polyamide and an antioxidant such as hindered phenol or hindered amine, which are incorporated after the polyacetals have been subjected to stabilization treatment to prevent decomposition of the molecules that occurs from their terminals. In working of the present invention, the stabilizer and antioxidant incorporated are neither detrimental nor obstructive to the effect of the present invention. The stabilizer and antioxidant are rather effective for improvement in heat stability of the polyacetal resin composition. This is therefore preferred. Commercially available polyacetals have the molded form of a powder, flakes or pellets. In the present invention, polyacetals having any form may be used. Therefore, the polyacetal for use in the present invention can be properly selected from commercially available polyacetals.

Examples of the polyfluorovinylidene used in the present invention preferably include a vinylidene fluoride homopolymer composed mainly of a vinylidene fluoride polymer chain and a copolymer or block polymer formed from such a vinylidene fluoride homopolymer and an ethylene-based unsaturated monomer copolymerizable therewith. A polyfluorovinylidene having a melt index (MI) (measured according to ASTM-D1238 at 235° C. under a load of 5 kg) of 0.01 to 1,000 is more preferred. Examples of the ethylene-based unsaturated monomer copolymerizable with vinylidene fluoride include vinyl fluoride, trifluoroethylene, chlorotrifluoroethylene, ethylene tetrafluoride and propylene hexafluoride. In addition, the content of vinylidene fluoride in the copolymer or block polymer is preferably 50 mol % or more based on the copolymer or block polymer. Polyfluorovinylidene is generally obtained by suspension polymerization or emulsion polymerization and has a form of a powder, flakes or pellets.

In the composition of the present invention, the proportion of the polyacetal is 80 to 99.9% by weight, and the proportion of the polyfluorovinylidene is 0.1 to 20% by weight. When the proportion of the polyacetal is less than 80% by weight or that of the polyfluorovinylidene exceeds 20% by weight, the resultant composition is deficient in mechanical strengths such as elongation, impact strength and flexural modulus and heat distortion temperature, and the heat distortion temperature decreases. Further, a coloring or discoloring sometimes occurs. On the other hand, when the proportion of the polyacetal exceeds 99.9% by weight, or that of the polyfluorovinylidene is less than 0.1% by weight, no sufficient effects of the present invention can be obtained.

The proportion of the polyacetal is preferably 90 to 99.5% by weight. Further, since polyfluorovinylidene is an expensive substance, the cost of the resultant composition increases when the proportion of the polyfluorovinylidene increases, and such a composition cannot be generally used. The proportion of the polyvinylidene fluoride is more preferably 0.5 to 10% by weight.

The resin composition of the present invention is produced, for example, by dry-blending the polyacetal and polyfluorovinylidene and then melt-kneading the resultant blend at least once at a temperature higher than the temperature of each of the polyacetal and the polyfluorovinylidene.

The melting point of the polyacetal differs depending upon its polymer composition. In general, the polyacetal has a melting point of 130° to 170° C. as a copolymer and 180° to 190° C. as a homopolymer. The melting point of the polyfluorovinylidene differs depending upon its polymer composition. However, the polyfluorovinylidene generally has a melting point of 150° to 180° C. as a homopolymer. When the melting and heating temperature is too high, the polyacetal is thermally decomposed. Therefore, the melting and heating temperature is generally set at a temperature between about 180° C. and 260° C.

For the improvement in mechanical properties, appearance and processability, the composition of the present invention may optionally contain known fillers, inorganic additives (such as molybdenum disulfide, tungsten disulfide, fluorographite, boron nitrate, etc.), thermoplastic polymers (such as a urethane resin, an acrylic resin, polyethylene, Teflon, etc.), an anti-slip agent, a mold release agent, a nucleating agent, an antistatic agent and a pigment. The fillers include glass fibers, carbon fibers, whiskers (such as potassium titanate, zinc oxide, silicon carbide, calcium sulfate, magnesium sulfate, alumina, etc.), flakes (such as mica, talc, glass flakes, kaolin flakes, graphite, etc.), spherical inorganic fillers (such as glass beads, glass balloons, spherical silica, spherical alumina, etc.) and amorphous inorganic fillers (such as magnesium hydroxide, calcium carbonate, etc.).

The specific methods for producing the resin composition of the present invention are as follows.

(1) A method in which the raw materials are mixed, and the mixture is kneaded and extruded with a single- or twin-screw extruder at a temperature between 180° C. and 260° C., thereby to obtain pellets of the intended composition.

(2) A method in which a predetermined amount of a master batch, which has been preliminarily prepared and contains a high concentration of polyfluorovinylidene, is mixed and diluted with the polyacetal and the resultant mixture is injection-molded, thereby to obtain a molded article of the intended composition.

(3) A method in which the raw materials are mixed and directly injection-molded at 180° to 260° C., thereby to obtain a molded article of the intended composition.

The above methods may be properly employed alone or in combination depending upon facilities to be used.

The study by the present inventors has also showed that, secondly, the afore-described objects and advantages of the present invention can be achieved by the following composition ("second resin composition" hereinafter).

That is, the second resin composition of the present invention is a polyacetal resin composition produced by melt-kneading 70 to 99.8% by weight of polyacetal, 0.1 to 20% by weight of polyfluorovinylidene and 0.05 to 10% by weight of an organic lubricant at a temperature higher than the melting point of each of the polyacetal and polyfluorovinylidene.

The second resin composition will be detailed hereinafter, in which it should be understood that the description of the first resin composition can apply to the description of the second resin composition except as otherwise stated.

In the second resin composition of the present invention, the proportion of the polyacetal is 70 to 99.8% by weight, and the proportion of the polyfluorovinylidene is 0.1 to 20% by weight. More preferably, the proportion of the polyacetal is 85 to 99.5% by weight, and the proportion of the polyfluorovinylidene is 0.2 to 10% by weight. The proportion of each of the polyacetal and the polyfluorovinylidene outside the above corresponding ranges is undesirable for the reasons described concerning the first resin composition.

In the present invention, the organic lubricant refers to known organic lubricants in the form of a liquid, wax, powders, fibers or particles at room temperature or under heat. Examples of the organic lubricant include silicone oil, paraffin, polyolefin wax, higher fatty acid, higher fatty acid metal salt, higher fatty acid ester, higher fatty acid amide, polyalkylene glycol (such as polyethylene glycol and polypropylene glycol), polyalkylene glycol fatty acid ester (such as polyethylene glycol fatty acid ester and polypropylene glycol fatty acid ester), polyolefin (such as polyethylene, polypropylene and a polyethylene copolymer), polyolefin-based graft polymer (such as a graft polymer obtained from polyethylene and either polymethyl methacrylate or an acrylonitrilestyrene copolymer) and polytetrafluoroethylene. Of these organic lubricants, more preferred are silicone oil, paraffin, polyolefin wax, higher fatty acid, higher fatty acid metal salt, higher fatty acid ester and higher fatty acid amide.

The above organic lubricants may be used alone or in combination.

The silicone oil is selected from polydimethylsiloxane oil; polydimethylsiloxane oil in which part of the methyl group is replaced with phenyl, hydrogen, alkyl having at least 2 carbon atoms, halogenated phenyl or fluoroester; epoxy-modified polydimethylsiloxane oil; amino-modified polydimethylsiloxane oil; alcohol-modified polydimethylsiloxane oil; polyether-modified polydimethylsiloxane oil; and alkyl aralkyl polyether-modified silicone oil. These silicone oils are all known.

The paraffin is preferably selected from known higher paraffinic hydrocarbons such as paraffin wax. The polyolefin wax is advantageously selected, for example, from known waxes of low molecular weight polyolefins having a number average molecular weight of 500 to 15,000 such as low molecular weight polyethylene, a low molecular weight polyethylene copolymer, oxidation-modified polyethylene wax thereof, acid-modified polyethylene wax thereof and polypropylene wax. These can be produced by a method in which ethylene and an α-olefin such as propylene are directly polymerized in the presence of a Ziegler-Natta catalyst, a method in which it is obtained as a by-product in the production of a high molecular weight polyolefin, or a method in which a high molecular weight polyolefin is thermally decomposed. The oxidation-modified polyethylene wax and the acid-modified polyethylene wax refer to those waxes having a polar group such as carboxyl, hydroxyl or sulfonic acid group introduced by modifying waxes with oxygen, peroxide, an inorganic acid, an organic acid or an unsaturated carboxylic acid.

The higher fatty acid is preferably selected from higher fatty acids having at least 10 carbon atoms such as caprylic acid, lauric acid, palmitic acid, stearic acid, myristic acid, behenic acid and cerotic acid. The higher fatty acid metal salt is preferably selected from calcium, magnesium, barium, zinc, lead or cadmium salts of the above higher fatty acids.

The higher fatty acid ester is preferably selected from esters of the above higher fatty acids with monohydric or polyhydric alcohols, esters of the above higher fatty acids with monovalent or divalent amines, and natural ester waxes such as bees wax, Chinese insect wax and spermaceti wax. In addition, the monohydric alcohols include capryl alcohol, lauryl alcohol, palmytyl alcohol, stearyl alcohol, myristyl alcohol, behenyl alcohol and cerotyl alcohol. The polyhydric alcohols include glycerin, ethylene glycol, propylene glycol, pentaerythritol and polyethylene glycol.

The higher fatty acid amide is preferably selected from amides of the above higher fatty acids with monovalent or polyvalent amines. The monovalent or polyvalent amines preferably include caprylamine, laurylamine, palmitylamine, stearylamine, myristylamine, methylenediamine, ethylenediamine, hexamethylenediamine and ammonia.

The above lubricants are used alone or in combination. The amount of the lubricant for use based on the total composition weight is preferably 0.05 to 10% by weight, more preferably 0.1 to 5% by weight. When this amount is less than 0.05% by weight, no sufficient frictional wear resistance can be obtained. When this amount exceeds 10% by weight, undesirably, the resultant composition is degraded or deteriorated in mold-processability, mechanical performances and appearance.

The second resin composition of the present invention may optionally contain those known fillers, etc., described concerning the first resin composition. The second resin composition can be produced in the same manner as in the first resin composition.

The polyacetal resin composition of the present invention is a self-lubricating composition which is produced by mixing a polyacetal with polyfluorovinylidene, and has excellent resistance to frictional wear, mechanical properties and low mold deposit properties. The polyacetal resin composition of the present invention can be therefore used as a material for various molded parts, particularly slide parts. In particular, the second resin composition of the present invention is especially excellent in the above properties due to a synergistic effect of the above-described polyacetal, polyfluorovinylidene and organic lubricant.

The present invention will be described further in detail hereinafter by reference to Examples and Comparative Examples, to which, however, the present invention shall not be limited.

In Examples and Comparative Examples, compositions were evaluated on kinetic friction coefficient, wear rate and mold deposit as follows. Concerning the other physical property values, compositions were tested and evaluated according to methods specified in ASTM.

(1) Kinetic friction coefficient and wear rate

A sample was measured for the kinetic friction coefficient with a thrust wear tester supplied by Orientech Co. at a surface pressure of 5 kg/cm$^2$ with a friction counterpart of carbon steel (S45C) and with a friction counterpart of the same resin as that of the sample. The wear rate was determined by measuring a sample for a wear loss after it was allowed to run 22 km.

(2) Mold deposit

A composition was injection-molded 1,500 shots with a screw preplasticizing injection molding machine (Minimat model, supplied by Sumitomo Heavy Industries, Ltd.) with a spade plate mold at a cylinder temperature of 230° C. at a mold temperature of 35° C. and at a molding cycle of 8 seconds, and a mold deposit in the mold was observed. A case where almost no mold deposit was present was taken as A, a case where a mold deposit was slightly present was taken as B, and a case where a mold deposit was clearly present was taken as C.

EXAMPLE 1

95 Parts by weight (9.5 kg) of polyacetal (Iupital F20-02, supplied by Mitsubishi Gas Chemical Company, Inc., melting point = 165° C., MI = 9 g/10 minutes), and 5 parts by weight (0.5 kg) of polyfluorovinylidene (KF polymer #850, supplied by Kureha Chemical Industry Co., Ltd., melting point = 177° C., melt flow rate = 23 g/10 minutes (ASTM-D1238, 235° C., 5 kgf/cm$^2$)) (see Table 1) were homogeneously mixed with a super mixer (supplied by Kawada Seisakusho), and the resultant mixture was kneaded and extruded with a twin-screw extruder (PCM-30, supplied by Ikegai Tekko Co.) at 200° C. to form pellets.

Then, part of the above pellets were injection-molded with an in-line screw type injection molding machine (PS-40 model, supplied by Nissei Jushi Kogyo Co.) at a cylinder temperature of 200° C. at a mold temperature of 80° C. and at a molding cycle of 30 seconds to give test pieces for strength tests according to ASTM-D638 and ASTM-D256 and cylindrical thrust test pieces, and these test pieces were tested and measured for a kinetic friction coefficient and tensile strength, and Izod impact strength.

Further, the remaining pellets were evaluated on a mold deposit.

The results in Table 2 show that a resin composition excellent in mechanical properties and low mold-deposit properties has been obtained according to the present invention.

EXAMPLE 2

Example 1 was repeated except that the amount of polyacetal (Iupital F20-02) was changed to 99 parts by weight (9.9 kg) and that the amount of polyfluorovinylidene (KF polymer #850) was changed to 1 part by weight (0.1 kg) (see Table 1), to give results shown in Table 2.

EXAMPLE 3

Example 1 was repeated except that the amount of polyacetal (Iupital F20-02) was changed to 90 parts by weight (9.0 kg) and that the amount of polyfluorovinylidene (KF polymer #850) was changed to 10 parts by weight (1.0 kg) (see Table 1), to give results shown in Table 2.

EXAMPLE 4

Example 1 was repeated except that the amount of polyacetal (Iupital F20-02) was changed to 80 parts by weight (8.0 kg) and that the amount of polyfluorovinylidene (KF polymer #850) was changed to 20 parts by weight (2.0 kg) (see Table 1), to give results shown in Table 2.

EXAMPLE 5

Example 1 was repeated except that the amount of polyacetal (Iupital F20-02) was changed to 96 parts by weight (9.6 kg) and that 5 parts by weight (0.5 kg) of the polyfluorovinylidene (KF polymer #850) was replaced with 4.0 parts by weight (0.4 kg) of KF polymer #1300 (supplied by Kureha Chemical Industry Co., Ltd., melting point = 177° C., melt flow rate = 1.1 g/10 minutes (ASTM-D1238, 235° C., 5 kgf/cm$^2$)) (see Table 1), to give results shown in Table 2.

EXAMPLE 6

Example 1 was repeated except that the amount of polyacetal (Iupital F20-02) was changed to 96 parts by weight (9.6 kg) and that 5 parts by weight (0.5 kg) of the polyfluorovinylidene (KF polymer #850) was replaced with 4.0 parts by weight (0.4 kg) of a vinylidene fluoride-hexafluoropropylene copolymer (supplied by Kureha Chemical Industry Co., Ltd., melting point = 160° C., melt flow rate = 3 g/10 minutes (ASTM-D1238, 235° C., 5 kgf/cm$^2$)) (see Table 1), to give results shown in Table 2.

EXAMPLE 7

Example 1 was repeated except that 22 parts by weight (2.2 kg) of chopped carbon fibers (Donacarbo S-241, supplied by Dainippon Ink and Chemicals, Inc.) were used in addition to 95 parts by weight (9.5 kg) of polyacetal (Iupital F20-02) and 5 parts by weight (0.5 kg) of polyfluorovinylidene (KF polymer #850) (see Table 1), to give results shown in Table 2.

EXAMPLE 8

Example 1 was repeated except that 27 parts by weight (2.7 kg) of glass beads (GB731B, supplied by Toshiba Barotini Co.) were used in addition to 95 parts by weight (9.5 kg) of polyacetal (Iupital F20-02) and 5 parts by weight (0.5 kg) of polyfluorovinylidene (KF polymer #850) (see Table 1), to give results shown in Table 2.

EXAMPLE 9

Example 1 was repeated except that 11 parts by weight (1.1 kg) of glass fibers (ECS-T-621, supplied by Nippon Electric Industry Co., Ltd.) were used in addition to 95 parts by weight (9.5 kg) of polyacetal (Iupital F20-02) and 5 parts by weight (0.5 kg) of polyfluorovinylidene (KF polymer #850) (see Table 1), to give results shown in Table 2.

EXAMPLE 10

Example 1 was repeated except that 16 parts by weight (1.6 kg) of talc (M talc, supplied by Takehara Kagaku Kogyo Co.) was used in addition to 95 parts by weight (9.5 kg) of polyacetal (Iupital F20-02) and 5 parts by weight (0.5 kg) of polyfluorovinylidene (KF polymer #850) (see Table 1), to give results shown in Table 2.

EXAMPLE 11

Example 1 was repeated except that 11 parts by weight (1.1 kg) of potassium titanate (Tismo-D, supplied by Otsuka Kagaku Yakuhin Co.) was used in addition to 95 parts by weight (9.5 kg) of polyacetal (Iupital F20-02) and 5 parts by weight (0.5 kg) of polyfluorovinylidene (KF polymer #850) (see Table 1), to give results shown in Table 2.

COMPARATIVE EXAMPLE 1

100 Parts by weight of polyacetal (Iupital F20-02) was treated and evaluated on a kinetic friction coefficient, mechanical strengths and a mold deposit in the same manner as in Example 1, to give results shown in Table 2.

COMPARATIVE EXAMPLE 2

Example 1 was repeated except that the amount of polyacetal (Iupital F20-02) was changed to 50 parts by weight (5.0 kg) and that the amount of polyfluorovinylidene (KF polymer #850) was changed to 50 parts by weight (5.0 kg) (see Table 1), to give results shown in Table 2.

COMPARATIVE EXAMPLE 3

Example 1 was repeated except that 5 parts by weight (0.5 kg) of the polyfluorovinylidene (KF polymer #850 was replaced with 5 parts by weight of polytetrafluoroethylene (Lubron L-5, supplied by Daikin Industries, Ltd.) (see Table 1), to give results shown in Table 2.

TABLE 1

| | Composition | | | | |
|---|---|---|---|---|---|
| | Polyacetal | (kg) | Polyfluoro-vinylidene | (kg) | Additive | (kg) |
| Example 1 | F20-02 | 9.5 | KF#850 | 0.5 | | 0 |
| Example 2 | F20-02 | 9.9 | KF#850 | 0.1 | | 0 |
| Example 3 | F20-02 | 9.0 | KF#850 | 1.0 | | 0 |
| Example 4 | F20-02 | 8.0 | KF#850 | 2.0 | | 0 |
| Example 5 | F20-02 | 9.5 | KF#1300 | 0.5 | | 0 |
| Example 6 | F20-02 | 9.6 | Copolymer | 0.4 | | 0 |
| Example 7 | F20-02 | 9.5 | KF#850 | 0.5 | Chopped carbon fiber | 2.2 |
| Example 8 | F20-02 | 9.5 | KF#850 | 0.5 | Glass beads | 2.7 |
| Example 9 | F20-02 | 9.5 | KF#850 | 0.5 | Glass fibers | 1.1 |
| Example 10 | F20-02 | 9.5 | KF#850 | 0.5 | Talc | 1.6 |
| Example 11 | F20-02 | 9.5 | KF#850 | 0.5 | Potassium titanate | 1.1 |
| Comparative Example 1 | F20-02 | 10.0 | | 0 | | 0 |
| Comparative Example 2 | F20-02 | 5.0 | KF#850 | 5.0 | | 0 |
| Comparative Example 3 | F20-02 | 9.5 | | 0 | Polytetra-fluoro-ethylene | 0.5 |

TABLE 2

| | Tensile strength (kgf/cm$^2$) | Izod Impact strength, notched (kgf-cm/cm) | Kinetic friction coefficient | | Evaluation on mold deposit |
|---|---|---|---|---|---|
| | | | With carbon steel | With the same resin | |
| Example 1 | 605 | 4.2 | 0.31 | 0.37 | A |
| Example 2 | 612 | 5.0 | 0.33 | 0.35 | A |
| Example 3 | 593 | 3.7 | 0.29 | 0.34 | A |
| Example 4 | 575 | 3.2 | 0.28 | 0.32 | A |
| Example 5 | 590 | 4.6 | 0.30 | 0.32 | A |
| Example 6 | 568 | 6.3 | 0.35 | 0.37 | A |
| Example 7 | 1417 | 4.8 | 0.25 | 0.37 | A |
| Example 8 | 577 | 5.5 | 0.37 | 0.37 | A |
| Example 9 | 1120 | 7.7 | 0.40 | 0.38 | A |
| Example 10 | 1065 | 3.1 | 0.30 | 0.32 | A |
| Example 11 | 760 | 4.4 | 0.33 | 0.38 | A |
| Comparative Example 1 | 620 | 5.9 | 0.36 | 0.40 | A B |
| Comparative Example 2 | 525 | 4.6 | 0.29 | 0.32 | A |
| Comparative Example 3 | 563 | 3.7 | 0.28 | 0.35 | C |

EXAMPLE 12

95 Parts by weight (9.5 kg) of polyacetal (Iupital F20-02), and 3.0 parts by weight (0.3 kg) of polyfluorovinylidene (KF polymer #850), and 2.0 parts by weight (0.2 kg) of polyethylene wax MH720P (Hiwax, supplied by Mitsui Petrochemical Industries, Ltd., ordinary low-density type, acid value=0, molecular weight=7,400, ethylene-propylene copolymer type) (see Table 3) were homogeneously mixed with a super mixer (supplied by Kawada Seisakusho), and the resultant mixture was kneaded and extruded with a twin-screw extruder (PCM-30) at 200° C. to form pellets.

Then, part of the above pellets were injection-molded with an in-line screw type injection molding machine (PS-40 model) at a cylinder temperature of 200° C. at a mold temperature of 80° C. and at a molding cycle of 30 seconds to give cylindrical thrust test pieces and test pieces for the strength test according to ASTM-D638, and these test pieces were tested and measured for a kinetic friction coefficient, a wear rate and mechanical strength.

Further, the remaining pellets were evaluated on a mold deposit with a screw preplasticizing injection molding machine (Minimat model).

The results are shown in Table 4. Table 4 shows that a resin composition excellent in resistance to frictional wear, mechanical properties and low mold deposit properties has been obtained according to the present invention.

EXAMPLE 13

Example 12 was repeated except that the amount of polyacetal (Iupital F20-02) was changed to 99 parts by weight (9.9 kg), that the amount of polyfluorovinylidene (KF polymer #850) was changed to 0.5 part by weight (0.05 kg) and that the amount of polyethylene wax MH720P was changed to 0.5 part by weight (0.05 kg) (see Table 3), to give results shown in Table 4.

EXAMPLE 14

Example 12 was repeated except that the amount of polyacetal (Iupital F20-02) was changed to 88 parts by weight (8.8 kg), that the amount of polyfluorovinylidene (KF polymer #850) was changed to 10 parts by weight (1.0 kg) and that the amount of polyethylene wax MH720P was changed to 2.0 parts by weight (0.2 kg) (see Table 3), to give results shown in Table 4.

EXAMPLE 15

Example 12 was repeated except that the amount of polyacetal (Iupital F20-02) was changed to 92 parts by weight (9.2 kg), that the amount of polyfluorovinylidene (KF polymer #850) was changed to 3.0 parts by weight (0.3 kg) and that the amount of polyethylene wax MH720P was changed to 5.0 parts by weight (0.5 kg) (see Table 3), to give results shown in Table 4.

EXAMPLE 16

Example 12 was repeated except that 2.0 parts by weight of the polyethylene wax MH720P was replaced with 2.0 parts (0.2 kg) of polydimethylsiloxane type silicone oil (KF-96, 50,000 cs (25° C.), supplied by Shin-Etsu Chemical Co., Ltd.) (see Table 3), to give results shown in Table 4.

EXAMPLE 17

Example 12 was repeated except that the amount of polyacetal (Iupital F20-02) was changed to 96.5 parts by weight (9.65 kg) and that 2.0 parts by weight of the polyethylene wax MH720P was replaced with 0.5 part by weight (0.05 kg) of polydimethylsiloxane type silicone oil (KF-96, 125,000 cs (25° C.), supplied by Shin-Etsu Chemical Co., Ltd.) (see Table 3), to give results shown in Table 4.

EXAMPLE 18

Example 12 was repeated except that the amount of polyacetal (Iupital F20-02) was changed to 96 parts by weight (9.6 kg) and that 2.0 parts by weight of the polyethylene wax MH720P was replaced with 1.0 part by weight (0.1 kg) of stearyl stearate as higher fatty acid ester (see Table 3), to give results shown in Table 4.

EXAMPLE 19

Example 12 was repeated except that the amount of polyacetal (Iupital F20-02) was changed to 96.9 parts by weight (9.69 kg) and that 2.0 parts by weight of the polyethylene was MH720P was replaced with 0.1 part by weight (0.01 kg) of zinc stearate as higher fatty acid metal salt (see Table 3), to give results shown in Table 4.

EXAMPLE 20

Example 12 was repeated except that the amount of polyacetal (Iupital F20-02) was changed to 96.5 parts by weight (9.65 kg), that 3.0 parts by weight (0.3 kg) of the polyfluorovinylidene (KF polymer #850) was replaced with 3.0 parts by weight (0.3 kg) of KF polymer #1100 (supplied by Kureha Chemical Industry Co., Ltd., melting point=177° C., melt flow rate=4.0 g/10 minutes (ASTM-D1238, 235° C., 5 kgf/cm$^2$)) and that 2.0 parts by weight of the polyethylene wax MH720P was replaced with 0.5 part by weight (0.05 kg) of ethylenebisstearylamide as a higher fatty acid amide (see Table 3), to give results shown in Table 4.

EXAMPLE 21

Example 12 was repeated except that the amount of polyacetal (Iupital F20-02) was changed to 97 parts by weight (9.7 kg), that 3.0 parts by weight (0.3 kg) of the polyfluorovinylidene (KF polymer #850) was replaced with 2.0 parts by weight (0.2 kg) of Neoflon VDF.VP-850 (supplied by Daikin Industries, Ltd., average particle diameter=about 6 μm, melting point=160° C., melt flow rate=2 to 3 cm$^3$/second (Koka type flow tester, die=1 φ×1 mm, 230° C., 30 kgf/cm$^2$)) and that 2.0 parts by weight of the polyethylene wax MH720P was replaced with 1.0 part by weight (0.1 kg) of behenic acid as a higher fatty acid (see Table 3), to give results shown in Table 4.

COMPARATIVE EXAMPLE 4

Example 12 was repeated except that the amount of polyacetal (Iupital F20-02) was changed to 98 parts by weight (9.8 kg) and that no polyfluorovinylidene was used (see Table 3), to give results shown in Table 4.

COMPARATIVE EXAMPLE 5

Example 12 was repeated except that the amount of polyacetal (Iupital F20-02) was changed to 97 parts by weight (9.7 kg) and that no polyethylene wax was used (see Table 3), to give results shown in Table 4.

COMPARATIVE EXAMPLE 6

Example 12 was repeated except that the amount of polyacetal (Iupital F20-02) was changed to 50 parts by weight (5.0 kg), that the amount of polyfluorovinylidene (KF polymer #850) was changed to 40 parts by weight (4.0 kg) and that the amount of polyethylene wax MH720P was changed to 10 parts by weight (1.0 kg) (see Table 3), to give results shown in Table 4.

COMPARATIVE EXAMPLE 7

Example 12 was repeated except that 3.0 parts by weight (0.3 kg) of the polyfluorovinylidene (KF polymer #850) was replaced with 3 parts by weight (0.3 kg) of polytetrafluoroethylene (PTFE) powders (Lubron L-5, supplied by Daikin Industries, Ltd.), to give results shown in Table 4.

TABLE 3

| | Polyacetal | (kg) | Polyfluorovinylidene | (kg) | Additive | (kg) |
|---|---|---|---|---|---|---|
| Example 12 | F20-02 | 9.5 | KF#850 | 0.3 | MH720P | 0.2 |
| Example 13 | F20-02 | 9.9 | KF#850 | 0.05 | MH720P | 0.05 |
| Example 14 | F20-02 | 8.8 | KF#850 | 1.0 | MH720P | 0.2 |
| Example 15 | F20-01 | 9.2 | KF#850 | 0.3 | MH720P | 0.5 |
| Example 16 | F20-01 | 9.5 | KF#850 | 0.3 | KF96-50000 | 0.2 |
| Example 17 | F20-01 | 9.65 | KF#850 | 0.3 | KF96-12500 | 0.05 |
| Example 18 | F20-01 | 9.6 | KF#850 | 0.3 | Stearyl stearate | 0.1 |
| Example 19 | F20-01 | 9.69 | KF#850 | 0.3 | Zinc stearate | 0.01 |
| Example 20 | F20-01 | 9.65 | KF#1100 | 0.3 | Ethylenebisstearylamide | 0.05 |
| Example 21 | F20-01 | 9.7 | VP-850 | 0.2 | Behenic acid | 0.1 |
| Comparative Example 4 | F20-01 | 9.8 | | 0 | MH720P | 0.2 |
| Comparative Example 5 | F20-01 | 9.7 | KF#850 | 0.3 | | 0 |
| Comparative Example 6 | F20-01 | 5.0 | KF#850 | 4.0 | MH720P | 1.0 |
| Comparative Example 7 | F20-01 | 9.5 | (PTFE | 0.3) | MH720P | 0.2 |

TABLE 4

| | Tensile strength (kgf/cm$^2$) | Kinetic friction coefficient | | Wear rate ($\times 10^{-2}$ mm$^3$/kg/km) | Evaluation on mold deposit |
|---|---|---|---|---|---|
| | | With carbon steel | With the same resin | | |
| Example 12 | 541 | 0.18 | 0.12 | 2 | A |
| Example 13 | 558 | 0.20 | 0.23 | 14 | A |
| Example 14 | 505 | 0.26 | 0.18 | 49 | A |
| Example 15 | 485 | 0.21 | 0.09 | 31 | A |

TABLE 4-continued

|  | Tensile strength (kgf/cm²) | Kinetic friction coefficient | | Wear rate (×10⁻² mm³/ kg/km) | Evaluation on mold deposit |
|---|---|---|---|---|---|
|  |  | With carbon steel | With the same resin |  |  |
| Example 16 | 490 | 0.20 | 0.18 | 2 | A |
| Example 17 | 550 | 0.26 | 0.25 | 10 | A |
| Example 18 | 563 | 0.16 | 0.33 | 2 | A |
| Example 19 | 537 | 0.21 | 0.17 | 29 | A |
| Example 20 | 547 | 0.20 | 0.15 | 17 | A |
| Example 21 | 536 | 0.19 | 0.20 | 3 | A |
| Comparative Example 4 | 540 | 0.26 | 0.27 | 14 | B |
| Comparative Example 5 | 560 | 0.30 | 0.33 | 66 | A |
| Comparative Example 6 | 445 | 0.28 | 0.29 | 78 | B |
| Comparative Example 7 | 565 | 0.18 | 0.19 | 5 | C |

What is claimed is:

1. A polyacetal resin composition produced by melt-kneading a mixture which consists essentially of 80 to 99.9% by weight of polyacetal and 0.1 to 20% by weight of polyfluorovinylidene at a temperature higher than the melting point of each of the polyacetal and the polyfluorovinylidene.

2. A polyacetal resin composition produced by melt-kneading a mixture which consists essentially of 70 to 99.8% by weight of polyacetal, 0.1 to 20% by weight of polyfluorovinylidene, and 0.05 to 10% by weight of an organic lubricant at a temperature higher than the melting point of each of the polyacetal and the polyfluorovinylidene.

3. A polyacetal resin composition which is produced by melt-kneading a mixture containing, as sole polymeric components, 80 to 99.9% by weight of polyacetal and 0.1 to 20% by weight of polyfluorovinylidene at a temperature higher than the melting point of each of the polyacetal and the polyfluorovinylidene, and which composition has excellent self-lubricity.

4. A polyacetal resin composition which is produced by melt-kneading a mixture containing, as sole polymeric components, 70 to 99.8% by weight of polyacetal, 0.1 to 20% by weight of polyfluorovinylidene and 0.05 to 10% by weight of an organic lubricant at a temperature higher than the melting point of each of the polyacetal and the polyfluorovinylidene, and which composition has excellent self-lubricity.

5. A polyacetal resin composition produced by melt-kneading a mixture which contains, as sole polymeric components, 80 to 99.9% by weight of polyacetal and 0.1 to 20% by weight of polyfluorovinylidene at a temperature higher than the melting point of each of the polyacetal and the polyfluorovinylidene.

6. A polyacetal resin composition produced by melt-kneading a mixture which contains, as sole polymeric components, 70 to 99.8% by weight of polyacetal and 0.1 to 20% by weight of polyfluorovinylidene, and 0.05 to 10% by weight of an organic lubricant at a temperature higher than the melting point of each of the polyacetal and polyfluorovinylidene.

7. A polyacetal resin composition which is produced by melt-kneading a mixture containing, as sole polymeric components, 70 to 99.8% by weight of polyacetal and 0.1 to 20% by weight of polyfluorovinylidene and 0.05 to 10% by weight of an organic lubricant selected from the group consisting of silicone oil, paraffin, polyolefin wax, higher fatty acid, higher fatty acid metal salt, higher fatty acid ester and higher fatty acid amide, at a temperature higher than the melting point of each of the polyacetal and polyfluorovinylidene, and which composition has excellent self-lubricity.

8. The polyacetal resin composition of claim 7, wherein the organic lubricant is silicone oil.

9. The polyacetal resin composition of claim 7, wherein the organic lubricant is polyolefin wax.

10. The polyacetal resin composition of claim 7, wherein the organic lubricant is higher fatty acid, higher fatty acid metal salt, higher fatty acid ester or higher fatty acid amide.

11. The polyacetal resin composition of claim 5, wherein the polyacetal is a homopolymer, a copolymer or a block polymer composed mainly of an oxymethylene chain.

12. The polyacetal resin composition of claim 5, wherein the polyfluorovinylidene is a homopolymer, a copolymer or a block polymer composed mainly of a vinylidene fluoride polymer chain.

13. The polyacetal resin composition of claim 5, wherein the amount of the polyacetal is 90 to 99.5% by weight and the amount of the polyfluorovinylidene is 0.5 to 10% by weight.

14. The polyacetal resin composition of claim 6, wherein the polyacetal is a homopolymer, a copolymer or a block polymer composed mainly of an oxymethylene chain.

15. The polyacetal resin composition of claim 6, wherein the polyfluorovinylidene is a homopolymer, a copolymer or a block polymer composed mainly of a vinylidene fluoride polymer chain.

16. The polyacetal resin composition of claim 6, wherein the organic lubricant is at least one member selected from the group consisting of silicone oil, paraffin, polyolefin wax, higher fatty acid, higher fatty acid metal salt, higher fatty acid ester and higher fatty acid amide.

17. The polyacetal resin composition of claim 6, wherein the amount of the polyacetal is 85 to 99.5% by weight, the amount of the polyfluorovinylidene is 0.2 to 10% by weight, and the amount of the organic lubricant is 0.1 to 5% by weight.

18. A molded article formed from the polyacetal resin composition of claim 5.

19. A molded article formed from the polyacetal resin composition of claim 6.

* * * * *